US007653900B2

(12) United States Patent
Kinderknecht et al.

(10) Patent No.: US 7,653,900 B2
(45) Date of Patent: Jan. 26, 2010

(54) SYSTEM AND METHOD FOR REMOTE APPLICATION PROCESS CONTROL

(75) Inventors: Cornell J. Kinderknecht, Addison, TX (US); Wei Lu, Coppell, TX (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 1037 days.

(21) Appl. No.: 10/829,499

(22) Filed: Apr. 22, 2004

(65) Prior Publication Data

US 2005/0240906 A1 Oct. 27, 2005

(51) Int. Cl.
*G06F 9/44* (2006.01)

(52) U.S. Cl. .......................................................... 717/163

(58) Field of Classification Search ................. 717/138, 717/164, 177, 163; 709/224, 228–229, 231, 709/236, 203, 217; 719/312, 313, 328, 331, 719/236, 310; 726/3, 4, 15
See application file for complete search history.

(56) References Cited

U.S. PATENT DOCUMENTS

| | | | | |
|---|---|---|---|---|
| 6,141,686 | A * | 10/2000 | Jackowski et al. | 709/224 |
| 6,148,336 | A * | 11/2000 | Thomas et al. | 709/224 |
| 6,397,255 | B1 | 5/2002 | Nurenberg et al. | |
| 6,412,071 | B1 * | 6/2002 | Hollander et al. | 726/23 |
| 6,609,159 | B1 * | 8/2003 | Dukach et al. | 719/331 |
| 6,611,862 | B2 * | 8/2003 | Reisman | 709/217 |
| 7,127,713 | B2 * | 10/2006 | Davis et al. | 717/177 |
| 7,406,533 | B2 * | 7/2008 | Li et al. | 709/236 |
| 2002/0092003 | A1 * | 7/2002 | Calder et al. | 717/138 |
| 2002/0178271 | A1 * | 11/2002 | Graham et al. | 709/229 |
| 2004/0039827 | A1 * | 2/2004 | Thomas et al. | 709/228 |
| 2004/0133897 | A1 * | 7/2004 | Covely, III | 719/328 |

OTHER PUBLICATIONS

Hwang et al, "Approach of Qos Library Redirection Method for DiffServ in Microsoft Window System", 2003, pp. 1-4 <http://web.archive.org/web/20031113204138/http://wshnt.ee.kuas.edu.tw/MyPapers/QOS03_7.PDF>.*

A. Lewycky et al., "DirectX and Wine", Jul. 16, 2001, 9 pages.

World Wide Web, http://msdn.microsoft.com/msdnmag/issues/02/02/PE/default.aspx, M. Pietrek, "An In-Depth Look into the Win32 Portable Executable File Format", printed Mar. 17, 2004, 11 pages.

World Wide Web, http://win32assembly.online.fr/pe-tut1.html, Iczelion, "Tutorial 1: Overview of PE File Format", printed Mar. 17, 2004, 2 pages.

World Wide Web, http://www.permeo.com/products.htm, "Products Overview", Permeo Technologies, printed Mar. 24, 2004, 2 pages.

(Continued)

*Primary Examiner*—Tuan Anh Vu
(74) *Attorney, Agent, or Firm*—Sonnenschein Nath & Rosenthal LLP

(57) ABSTRACT

A system for controlling an application process comprises an injector, redirect code operable to be placed in a memory of the application process, and a library of redirect functions operable to be referenced by the redirect code during the application process execution. The redirect code is operable to intercept a set of target function calls made by the application process and execute the redirect functions for the intercepted target function calls.

17 Claims, 7 Drawing Sheets

OTHER PUBLICATIONS

World Wide Web, http://www.permeo.com/ssl_user.htm, “Permeo User Experience”, Permeo Technologies, printed Mar. 24, 2004, 2 pages.

World Wide Web, http://www.permeo.com/remoteaccess.htm, “Permeo SSL Remote Access”, Permeo Technologies, printed Mar. 24, 2004, 2 pages.

World Wide Web, http://www.permeo.com/ssl_faq.htm, “Permeo SSL Remote Access FAQ”, Permeo Technologies, printed Mar. 24, 2004, 6 pages.

World Wide Web, http://www.permeo.com/ssl_cleanupdmz.htm, “Clean Up the DMZ”, Permeo Technologies, printed Mar. 24, 2004, 2 pages.

* cited by examiner

SYSTEM AND METHOD FOR REMOTE APPLICATION PROCESS CONTROL

BACKGROUND

For today's organizations, delivering the necessary access to business-critical applications and information is more complex than ever before. Users that are granted access to these resources include employees as well as contractors, temporary employees, suppliers, partners, customers, and even government agencies. These users are often distributed around the world on diverse private and public networks. They are also often mobile and not tied down to one location. Adding to the complexity is the wide range of resources the users need to access, including web applications, legacy and homegrown applications, client-server and peer-to-peer applications, and real-time collaborative services. An added challenge is the increasing threat of computer attacks. These computer attacks are becoming increasingly sophisticated. Providing secured access for this seemingly infinite number of possible combinations of users, networks, and applications is daunting—yet critical to a company's success.

SUMMARY OF THE INVENTION

In one embodiment of the system and method of remote application process control, a system for controlling an application process comprises an injector, redirect code operable to be placed in a memory of the application process, and a library of redirect functions operable to be referenced by the redirect code during the application process execution. The redirect code is operable to intercept a set of target function calls made by the application process and execute the redirect functions for the intercepted target function calls.

In another embodiment, a method for controlling an application process comprises pushing an injector to a device executing the application process, injecting a redirect code into the application process, executing the redirect code in the application process to reference a redirect library of redirect functions, resuming the execution of the application process, and intercepting at least one target function calls made by the application process and executing at least one redirect function in place of the at least one target function calls.

In yet another embodiment, a method comprises receiving user information, authenticating the user information, pushing an injector to a device executing the application process, and intercepting at least one target function calls made by the application process to at least one of a plurality of secure resources and executing at least one redirect function in place of the at least one target function calls.

DETAILED DESCRIPTION

Figure 1:
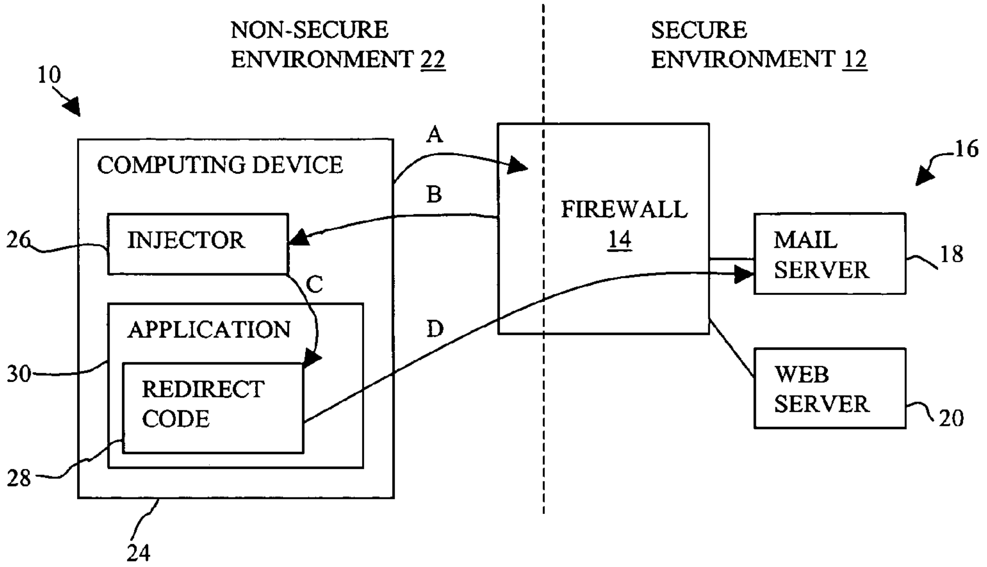
FIG. 1 is a simplified block diagram of an embodiment of a system and method for remote application process control.

A solution for secured access by a wide range of users to company computer resources and data is by using a way to enable "remote control" of a user's application so that it may communicate and bypass a firewall to access the computer resources. FIG. 1 is a simplified block diagram of an embodiment of a system and method 10 for remote application process control. A secure computing environment 12 is protected from unauthorized access by a firewall 14 deployed in the demilitarized zone (DMZ) at the interface between secure environment 12 and non-secure environment 22. Firewall 14 may be any hardware and/or software that prevent unauthorized access to or from a private network. Firewall 14 may be a packet filter, an application gateway, a circuit-level gateway, a proxy server, or a combination of these systems. For example, firewall 14 may be the Application Security Gateway (ASG) offered by Permeo Technologies, Inc. of Irving, Tex. ASG is a secure bi-directional proxy-based application gateway that supports Internet transport protocols such as TCP (Transmission Control Protocol) and UDP (User Datagram Protocol). In secure computing environment 12, a plurality of hardware and/or software resources 16, including a mail server 18 and web server 20, for example, are accessible via firewall 14 by users external to secure environment 12. Users in non-secure environment 22 may use a wide range of computing devices 24 such as desktop computers, laptop computers, notebook computers, personal digital assistants, and devices now known or to be developed. These computing devices 24 use wired and wireless technologies and protocols to communicate with other computing devices via one or more public and/or private networks.

In an embodiment of system and method 10, a user may use a computing device 24 to log-on at a predetermined website providing access to resources 16 inside secure environment 12, as indicated by notation A. A web browser application may be used for this log-on function for the user to enter the predetermined website URL (uniform resource locator), download one or more web pages associated with the predetermined website, and convey log-on information to be authenticated by the website. For example, the user may be asked to provide a username and password or other identifying information as part of the log-in process. Once the log-on information is authenticated and verified, firewall 14 and/or one or more applications executing therein pushes down an injector agent 26 to computing device 24, as indicated by notation B. Injector agent 26 is preferably a lightweight and transparent piece of application code that is operable to "inject" a piece of redirect code 28 into a communication application 30, as indicated by notation C. The user uses communication application 30 such as an email client like MICROSOFT OUTLOOK to send and receive data such as email messages. Communication application 30 may also comprise web browsers, remote terminal access, file transfer, streaming multimedia, Internet telephony, network management, and other applications. Currently, these communication applications 30 use TCP or UDP transport protocols. Redirect code 28 is operable to enable application 30 to communicate with firewall 14 using its authentication and encryption technology, as designated by notation D.

Using this technology, users do not have to possess special communication hardware or software to enjoy encrypted communication with firewall 14 to access secured resources 16. Injected code 28 is operable to intercept and redirect traffic between computing device 24 and firewall 14. For example, SSL (Secure Sockets Layer) encryption employed by firewall 14 may be applied in this manner to all TCP and UDP traffic, for example, between user devices in non-secure environment 22 and resources in secure environment 12.

Figure 2:
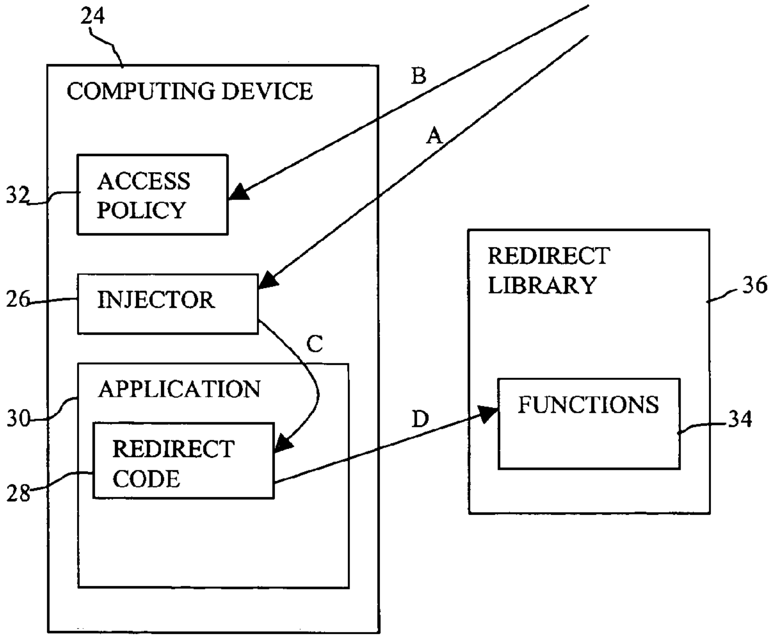
FIG. 2 is a more detailed block diagram of an embodiment of a system and method for remote application process control.
Figure 3:
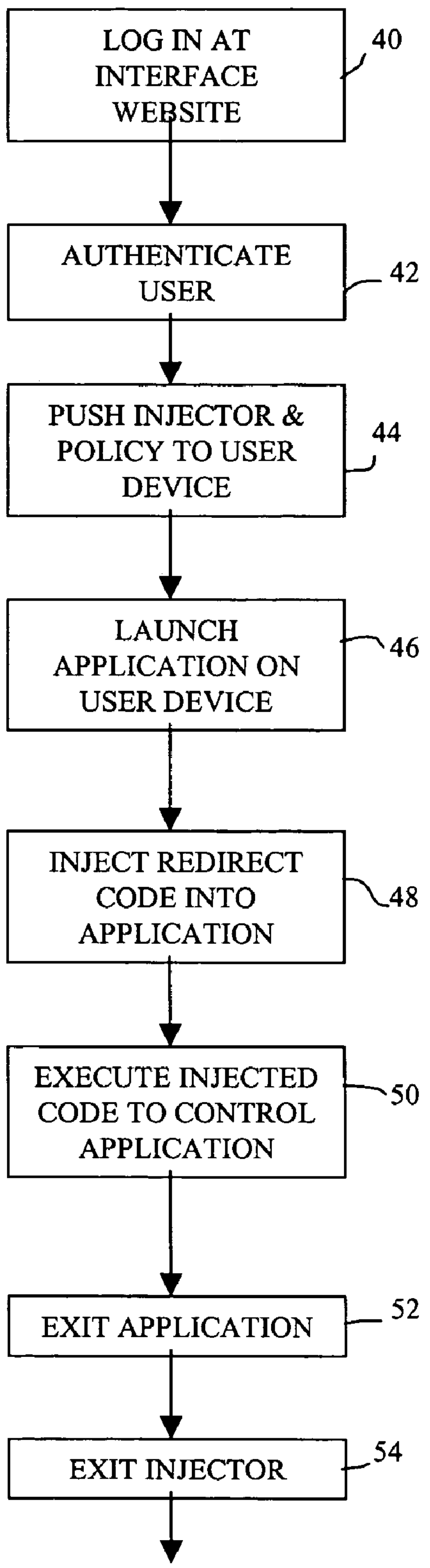
FIG. 3 is a simplified flowchart of an embodiment of a method for remote application process control.

FIG. 2 is a more detailed block diagram of an embodiment of a system and method 10 for remote application control. With reference also to FIG. 3, a user uses a computing device 24 to log in at an interface website, as shown in block 40. Computing device 24 is equipped with a web browser application in order to access web pages on the World Wide Web. At the interface website, the user is greeted and user information is solicited for authentication. The user may be prompted to provide a user name and a password, for example. In block 42, the user's provided information is authenticated and verified. In block 44, the interface website pushes an injector 26 as well as an access policy 32 down to the user's computing device 24, as indicated by notation A and B. Access policy 32 is optional and may be used to specify those resources in secure environment 12 that the user has authorization to access. Thereafter, when the user launches a particular application 30, such as an email client, on computing device 24 in block 46, injector 26 injects a redirect code 28 into application 30 in block 48 (notation C). Redirect code 28 is operable to point to replacement functions 34 in a redirect library 36, as indicated by notation D. The injected code is executed instead of the original code in block 50. Therefore, selected function calls may be intercepted by redirecting execution to redirect functions 34 in redirect library 36. For example, all socket calls may be intercepted and redirected to redirect functions 34. Details of this process are described below and shown in FIGS. 4-8. In blocks 52 and 54, at the end of a communication session, the application exits and the injector also exits.

Figure 4:
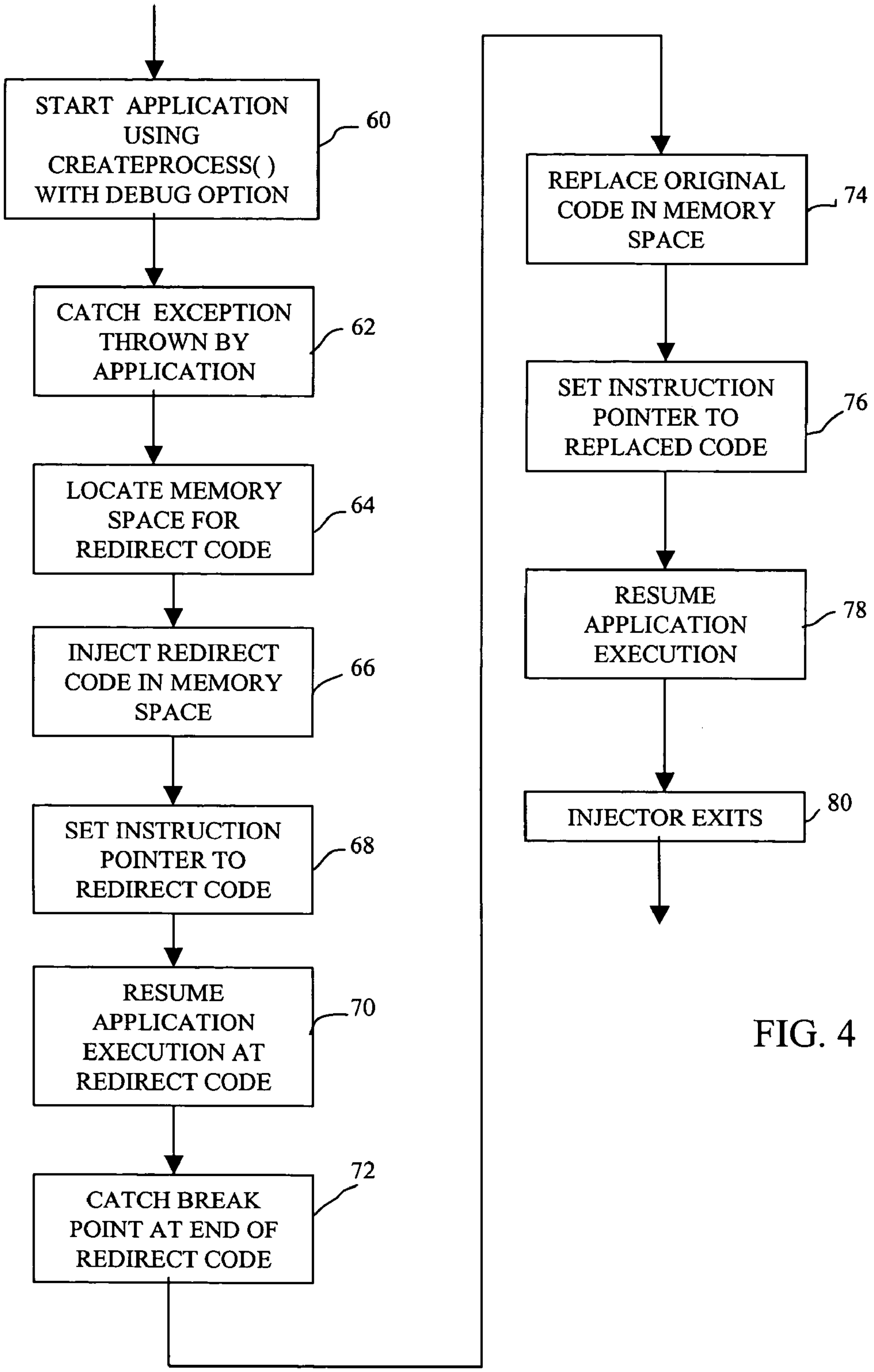
FIG. 4 is a more detailed flowchart of an embodiment of a method for remote application process control.

FIG. 4 is a more detailed flowchart of an embodiment of a method 60 for remote application control. The description below also makes references to FIGS. 1 and 2. In block 60, injector 26 that has been pushed down to the user's computing device 24 launches application 30 using a debug mechanism provided by the operating system. For example, in WINDOWS 95, WINDOWS 98, and WINDOWS MILLENNIUM EDITION, the CreateProcess( ) function with the DEBUG_ONLY_THIS_PROCESS option may be used to start application 30. Application 30 is thus treated as an application that is to be debugged, which "throws" an exception and suspends right after it is started. In block 62, injector 26 "catches" the exception. This debug mechanism is used to interrupt the execution of the application process. Injector 26 examines the memory locations of the application process space and locates a page of memory that may be temporarily replaced with redirect code 28 in block 64. Injector 26 copies the original code in the memory space to a temporary location and injects or copies redirect code 28 into the memory space in block 66. The last instruction in redirect code 28 placed in the memory space is a break point. In block 68, injector uses a function such as SetThreadContext( ) to set the instruction pointer of application 30 to the beginning of redirect code 28 that now exists in the application's memory space. In block 70, application 30 resumes the application thread at the memory location pointed to by the instruction pointer, which points to the redirect code. The redirect code then executes to intercept certain function calls such as socket calls. The details of the processes of redirect code 28 are described in more detail below with references to FIGS. 7 and 8. At the end of redirect code execution, injector 26 catches the break point in block 72. Injector 26 then replaces the original code back into the application's memory space in block 74. The instruction pointer is reset to the appropriate location in the application's instructions in block 76 and the main thread of application 30 resumes execution in block 78. Further exceptions and break points are handed off to the operating system and injector 26 exits when application 30 exits in block 80.

Figure 5:
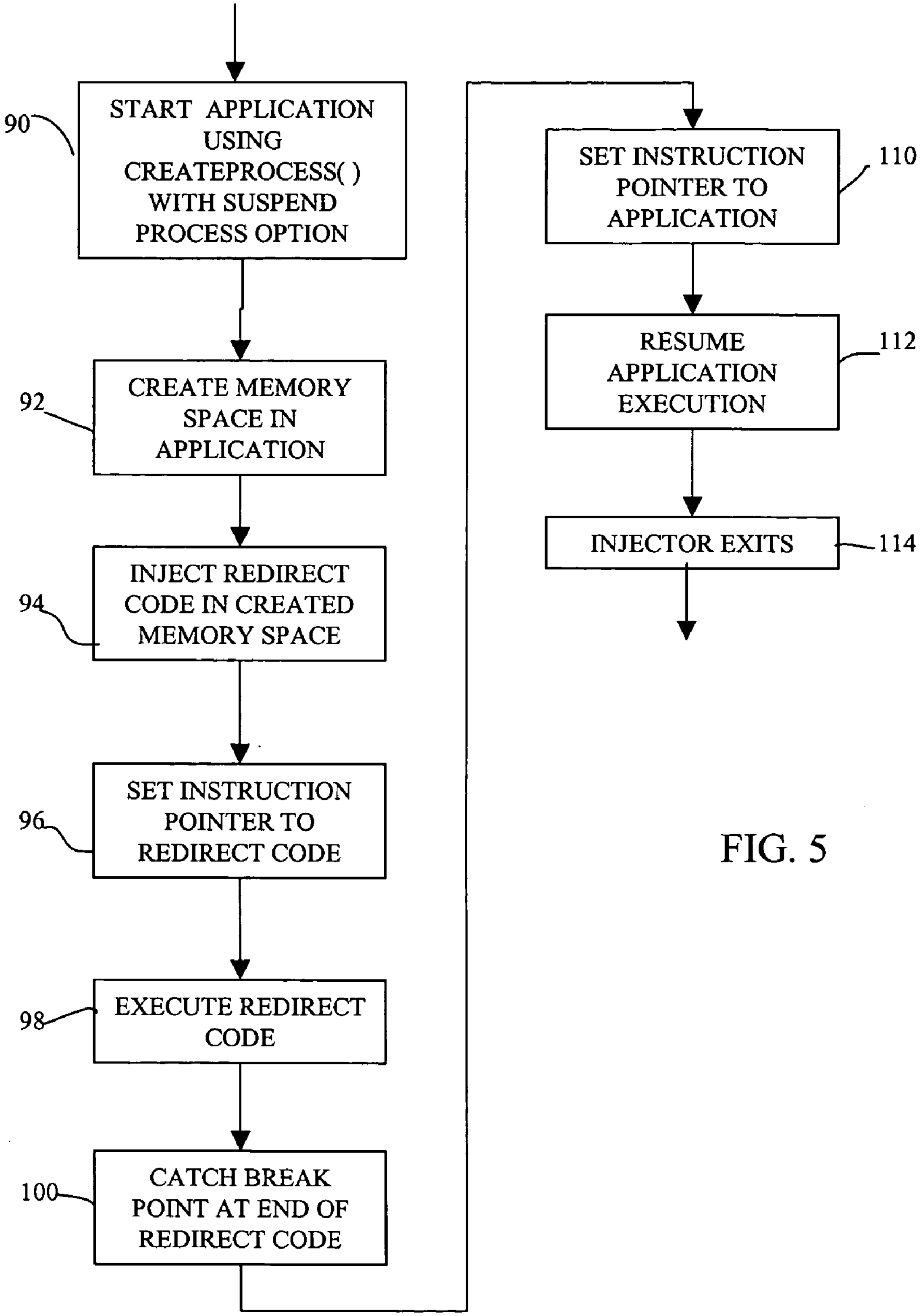
FIG. 5 is a more detailed flowchart of another embodiment of a method for remote application process control.

FIG. 5 is a more detailed flowchart of another embodiment of a method 90 for remote application control. Method 90 is a preferred mechanism used for operating systems such as WINDOWS NT, WINDOWS 2000 and WINDOWS XP. In block 90, injector 26 uses CreateProcess( ) with the CREATE_PROCESS_SUSPENDED option to launch application 30 so that it starts in a suspended state. This suspend mechanism is used to interrupt the execution of the application process. Injector 26 uses a function such as VirtualAllocEx to create memory inside the suspended application 30 in block 92 and injects redirect code 28 into the created memory space in block 94. The last instruction in redirect code 28 copied into the created memory space is a break point, for example. Injector 26 then sets the instruction pointer to the beginning of the created memory space where the first instruction of redirect code 28 is located in block 96 and the redirect code executes in block 98. When redirect code 28 comes to its last instruction, injector 26 catches the break point in block 100 and resets the instruction pointer to the applications main thread in block 110. The application resumes execution in block 112. Further exceptions and break points are handed off to the operating system to handle and injector 26 exits when application 30 exits in block 114.

Figure 6:
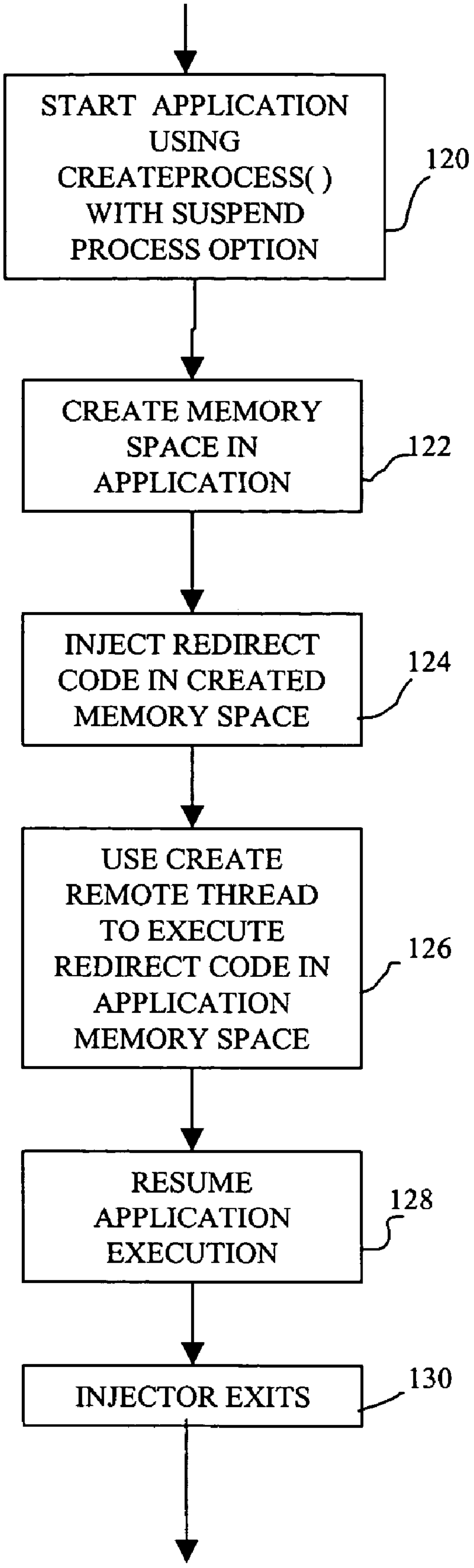
FIG. 6 is a more detailed flowchart of yet another embodiment of a method for remote application process control.

FIG. 6 is a more detailed flowchart of yet another embodiment of a method 120 for remote application control. Method 120 is also applicable for operating systems such as WINDOWS NT, WINDOWS 2000 and WINDOWS XP. In block 120, injector 26 uses CreateProcess( ) with the suspend option such as CREATE_PROCESS_SUSPENDED to launch application 30 so that it starts in a suspended state. Injector 26 then creates memory inside the suspended application 30 using a function such as VirtualAllocEx in block 122 and injects redirect code 28 into the created memory space in block 124. The last instruction in redirect code 28 copied into the created memory space is a resume function for the application's main thread such as ResumeThread( ). Injector 26 then uses a function such as CreateRemoteThread( ) to execute redirect code 28 in a thread in the application's process space in block 126. When redirect code 28 comes to its last instruction, the ResumeThread( ) instruction returns execution to the application's main thread in block 128. The injected redirect code thread then suspends until the application exits, at which time injector 26 also exits in block 130.

Figure 7:
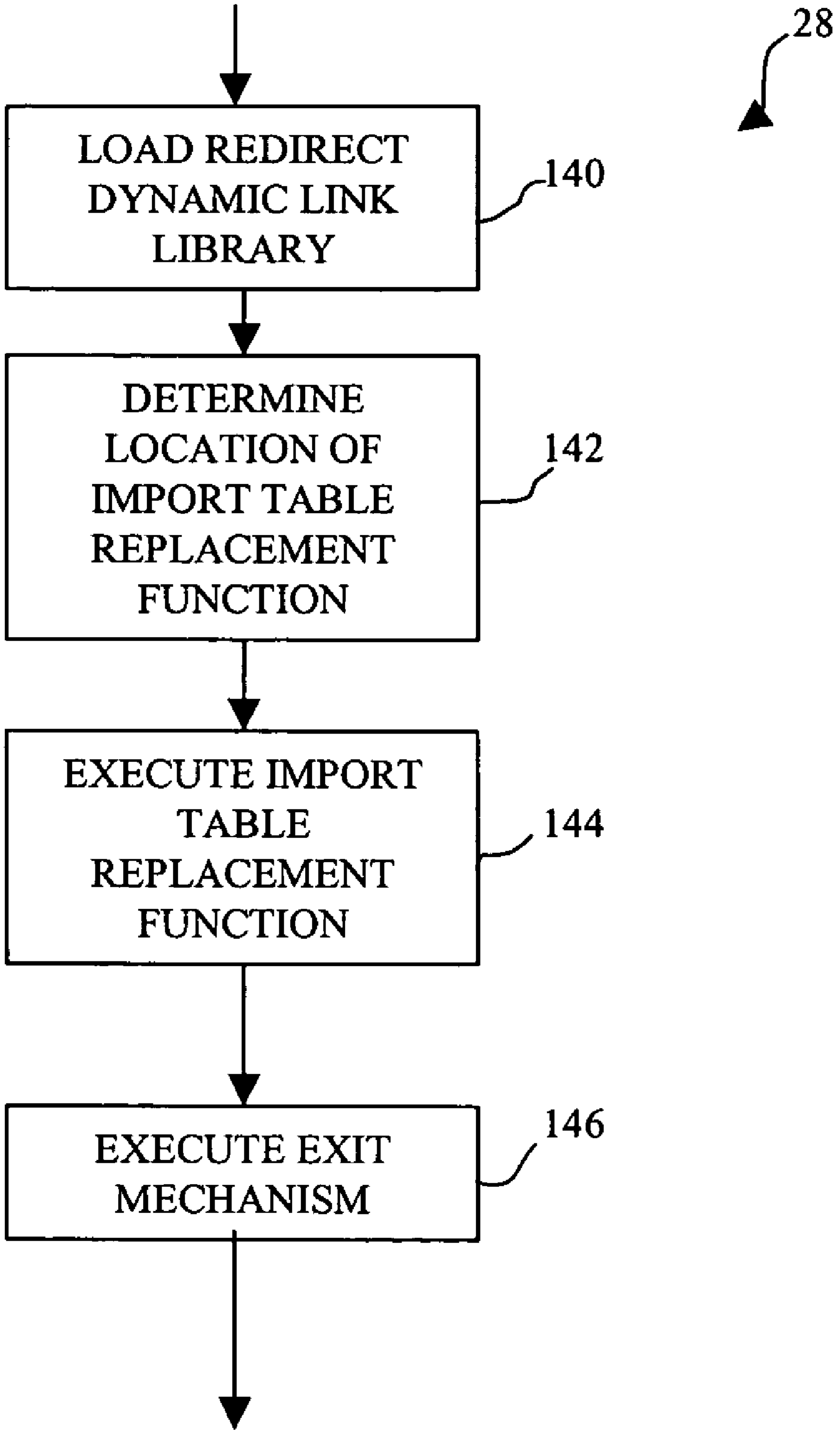
FIG. 7 is a simplified flowchart of an embodiment of code injected into the application.

FIG. 7 is a simplified flowchart of an embodiment of redirect code injected into application 30. In block 140, redirect code 28 loads the redirect dynamic link library (DLL) using a function such as LoadLibrary( ). Redirect dynamic link library 36 contains functions 34 that are operable to intercept certain function calls and other means of controlling application 30. In block 142, a determination is made as to the address location of the function in redirect dynamic link library 36 that performs the import table replacement function. This may be performed by using the GetProcAddress( ) function, for example. The import table replacement function is then executed in block 144. The import table is a data section in the portable executable or PE header of a Win32 file that points to addresses of functions in a dynamic link library. By replacing the import table with address references to redirect dynamic link library 36, calls to functions in the original dynamic link library are replaced by calls to functions in the redirect dynamic link library. Functions in the redirect dynamic link library may perform certain tasks prior to calling the original function in the original dynamic link library. In this manner, the application's function calls can be intercepted. Because not all function calls are made in the main module of application 30, but can be made inside another library module that is called by the application, a recursive search may be performed to look for and modify import tables of any dynamic link library that are loaded into the application's process space. Thereafter, the redirect code exits either using debug break point or suspension in block 146.

Figure 8:
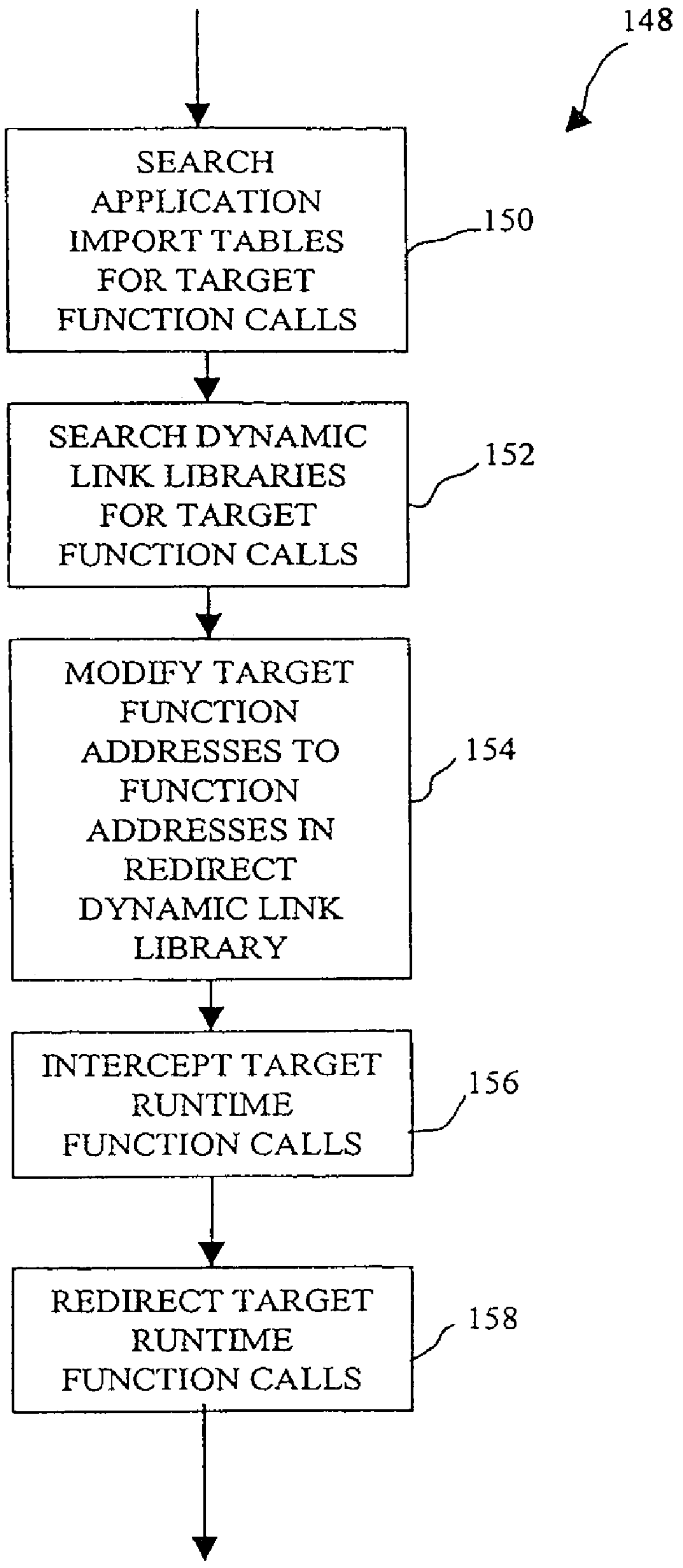
FIG. 8 is a simplified flowchart of an embodiment of a process of intercepting application function calls.

FIG. 8 is a simplified flowchart of an embodiment of a process 148 of intercepting application function calls. Process 148 is performed by an import table replacement function in redirect code 28. Process 148 recursively searches the import tables (in the portable executable header) of the application's main module in block 150 as well as all dynamic link libraries that are mapped into the process space in block 152 for a set of target function addresses. The target functions are functions that redirect code 26 is interested in intercepting so that its functionality may be remotely controlled. For example, all socket functions exported by WINSOCK.DLL, WSOCK32.DLL, and WS2_32.DLL are target functions when the application process control is interested in intercepting network traffic or socket calls to securely communicate via firewall 14. To accomplish other goals, other types of target functions may be intercepted using this method. When the target function addresses are found, the in-process memory of the module is modified to point at the replacement function addresses in redirect dynamic link library 36 in block 154. Because the previous steps would enable the intercept of functions in the dynamic link libraries whose import tables were linked into the application or other dynamic link libraries at compile time, process 148 also needs to intercept functions in the dynamic link libraries that are loaded at runtime. In blocks 156 and 158, kernel function calls such as LoadLibrary( ) and GetProcAddress( ) are also intercepted and the results of those function calls are replaced with redirect function addresses. Further, process 148 also targets applications that get started by the main application, CreateProcess( ) family of functions are also of interest. To capture all of these function calls, process 155 148 recursively searches and replaces function calls of interest in those dynamic link libraries and any additional dynamic link libraries that may be addressed by them in block 158. When LoadLibrary( ) function is encountered at runtime, once the dynamic link library is loaded into memory, the import table of that dynamic link library, and recursively, any dynamic link libraries loaded by that dynamic link library are searched and the import table function replacement is carried out. When GetProcAddress( ) is encountered at runtime for a function that has been replaced, the address of the replacement function in the redirect dynamic link library is returned instead. When CreateProcess( ) or one of its variant functions is intercepted at runtime, a new injector is started that performs the injection procedure on the new target application as described above.

The methods described above may be modified for other operating systems. For example, for the UNIX operating system, an injector and a library containing replacement functions are used. The injector in this case is operable to instruct the operating system loader to put the redirect code in the global resolved symbol table first and then start the target application. The system loader automatically instructs application programs to call the replacement functions instead of the original functions.

Using the remote application process control described above, a particular goal of enabling secured remote access to internal secured networks and resources can be realized. Secured native local access to desktop applications or web-based applications are thus enabled without deploying any additional client software on the user device. The secure firewall application described herein is provided as an example and the application process control method may be used to achieve other remote control applications by intercepting other target functions that perform other tasks.

What is claimed is:

1. A system for controlling an application process comprising:

first computer means associated with a secured computing environment, the first computer means for recognizing a request for access by a client computer to resources of the secured computing environment, the client computer being remote from the secured computing environment, for pushing an access policy to the client computer, the access policy identifying resources in the secured computing environment authorized for access by the client computer, and for providing to the client computer an injector to be stored on the client computer, the injector operable to inject redirect code into a memory space used by an application process executing on the client computer, the application process for communicating with the resources of the secured computing environment for which access is requested; and a library of redirect functions operable to be referenced by the redirect code during execution of the application process, wherein the redirect code is operable to (i) intercept at least one function call made by the application process to access secured data associated with the resources of the secured computing environment for which access is requested, and (ii) execute at least one of the redirect functions in place of the at least one intercepted function call so as to enable the application process, executing at the first computing device, to access the secured data, wherein the first computer means comprises a firewall securing all access to the resources in the secured computing environment.

2. The system, as set forth in claim 1, wherein the at least one function call comprises a socket function call.

3. The system, as set forth in claim 1, wherein the library of redirect functions comprises a dynamic link library.

4. The system, as set forth in claim 1, wherein the application process comprises an application operable to communicate with the secured computing environment resources using an Internet transport protocol, the redirect code, and the redirect functions.

5. The system, as set forth in claim 1, wherein the application process comprises an email application.

6. The system, as set forth in claim 1, wherein the application process comprises a web browser application.

7. The system, as set forth in claim 1, wherein the application process comprises a file transfer application.

8. A method for controlling an application process comprising:

pushing, from first computer means associated with a secured computing environment to a first computing device remote from the secured computing environment and enabled to execute the application process, (i) an access policy specifying resources accessible by a user associated with user information received and authenticated at the first computer means and (ii) an injector, said pushing being responsive to a request for access by the first computing device to a resource of the secured computing environment; and at the first computing device, starting an execution of the application process, the application process for communicating with the resource of the secured computing environment, interrupting the execution of the application process, injecting, via the injector, a redirect code into a memory space of the first computing device used by the application process, and executing the redirect code in the application process to reference a redirect library of redirect functions so that upon resuming the execution of the application process, the redirect code is operable to (i) intercept at least one function call made by the application process to access secured data at the resource of the secured computing environment for which access is requested, and (ii) execute at least one redirect function in place of the at least one function call so as to enable the application process, executing on the first computing device, to access the secured data, wherein said first computer means comprises a firewall.

9. The method, as set forth in claim 8, wherein starting and interrupting the execution of the application process comprises starting the execution of the application process using a debug option, and catching an exception thrown by the application process; and wherein injecting the redirect code comprises locating memory space used by the application process, injecting the redirect code into the memory space used by the application process, and setting an instruction pointer to the redirect code.

10. The method, as set forth in claim 8, wherein starting and interrupting the execution of the application process comprises starting the execution of the application process using a suspend option; and wherein injecting the redirect code comprises creating memory space in the application process, injecting the redirect code into the memory space of the application process, and setting an instruction pointer to the redirect code.

11. The method, as set forth in claim 8, wherein starting and interrupting the execution of the application process comprises starting the execution of the application process using a suspend option; and wherein injecting the redirect code comprises creating memory space in the application process, injecting the redirect code into the memory space of the application process, and using a create remote thread function to execute the redirect code.

12. The method, as set forth in claim 8, wherein executing the redirect code comprises:

loading the redirect library of redirect functions;

determining a location of an import table replacement function in the redirect library; and executing the import table replacement function.

13. The method, as set forth in claim 12, wherein loading the redirect library of redirect functions comprises loading a dynamic link library.

14. The method, as set forth in claim 12, wherein executing the import table replacement function comprises:

searching an import table of the application process for the at least one function call; and modifying the at least one function call to reference one or more redirect functions in the redirect library.

15. The method, as set forth in claim 12, wherein executing the import table replacement function comprises:

searching dynamic link libraries of the application process for the at least one function call; and modifying the at least one function call to reference one or more redirect functions in the redirect library.

16. The method, as set forth in claim 8, wherein intercepting the at least one function call comprises intercepting at least one socket function call.

17. The method, as set forth in claim 8, further comprising executing redirect functions to enable secured access by the first computing device to a plurality of resources of the secured computing environment via the firewall.

* * * * *